(12) United States Patent
Waldvogel et al.

(10) Patent No.: US 8,880,502 B2  
(45) Date of Patent: Nov. 4, 2014

(54) SEARCHING A RANGE IN A SET OF VALUES IN A NETWORK WITH DISTRIBUTED STORAGE ENTITIES

(75) Inventors: Marcel Waldvogel, Stein am Rhein (CH); Roman A. Pletka, Horgen (CH)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 11/079,554

(22) Filed: Mar. 14, 2005

(65) Prior Publication Data

US 2005/0203901 A1 Sep. 15, 2005

(30) Foreign Application Priority Data

Mar. 15, 2004 (EP) .................................. 04405154

(51) Int. Cl.
- *G06F 7/00* (2006.01)
- *H04L 29/08* (2006.01)
- *G06F 17/30* (2006.01)

(52) U.S. Cl.
CPC ...... *G06F 17/30545* (2013.01); *H04L 67/1097* (2013.01); *G06F 17/30575* (2013.01)
USPC .......................................................... 707/713

(58) Field of Classification Search
CPC ................................................. G06F 17/30575
USPC .................................................. 707/5, 713
See application file for complete search history.

(56) References Cited

U.S. PATENT DOCUMENTS

2003/0099237 A1* 5/2003 Mitra et al. .................... 370/393
2003/0182282 A1* 9/2003 Ripley .............................. 707/5

* cited by examiner

*Primary Examiner* — Apu Mofiz
*Assistant Examiner* — Ajith Jacob
(74) *Attorney, Agent, or Firm* — Michael J. Buchenhorner; Vazken Alexanian

(57) ABSTRACT

Methods for searching a range in a set of values in a network with distributed storage nodes. An example of a method for searching a range in a set of values in a network with distributed storage nodes according to the invention comprises the following steps. First, the range is divided up into a set of subranges by means of a hierarchical structure. Then, a query packet is generated for said set of subranges and transmitted to the distributed storage nodes for performing the query.

16 Claims, 3 Drawing Sheets

SEARCHING A RANGE IN A SET OF VALUES IN A NETWORK WITH DISTRIBUTED STORAGE ENTITIES

TECHNICAL FIELD

The present invention relates to a method, an entity, and a data network for searching a range in a set of values in a network with distributed storage entities, and moreover, to a method, an entity, and a data network for supporting insertion and/or disconnection of data in/from a distributed storage system.

BACKGROUND OF THE INVENTION

Peer-to-peer (P2P) internet applications have recently been popularized through file sharing applications like Napster™ (Napster is a registered trademark for Napster, Inc, and/or for Roxio, Inc.), Gnutella, and Freenet. Peer-to-peer systems have many interesting technical aspects like decentralized control, self organization and adaptation. They can be characterized as distributed systems in which network nodes have identical capabilities and responsibilities and communication is symmetric. Considering all the network nodes as peers results in a completely flat structure of the network.

Peer-to-peer designs harness huge amounts of resources—the content advertised through Napster™ has been observed to exceed 7 TByte of storage on a single day, without requiring centralized planning or huge investments in hardware, bandwidth, or rack space. As such, peer-to-peer file sharing may lead to new content distribution models for applications such as software distribution, document sharing, and static web content delivery.

Just as important as storing data is the mechanism for searching data, e.g. for searching a document. In a method described in the publication "Querying the Internet with PIER", Ryan Huebsch, Joseph Hellerstein, Nick Lanham, Boon Loo, Scott Shenker and Ion Stoica, Proceedings of the 29$^{th}$ VLDB Conference, Berlin, Germany 2003, database tables are distributed amongst multiple hosts and then retrieved in parallel. However, this method does not integrate the database into a distributed hash table (DHT) environment. Therefore, the described method needs considerable storage capacities.

In the IBM patent application EP 03405516.0, filed on Jul. 10, 2003, a method for locating documents in a network with distributed storage nodes is described. According to this method, for example, a query for a document showing a thumbnail picture of a sunflowers painting by van Gogh can be performed. Therefore, at a requesting entity, the following keywords are generated:

("Artist=Van", "Artist=Gogh", "Title=Sunflowers", "Thumbnail"), wherein
keyword1="Artist=Van",
keyword2="Artist=Gogh",
keyword3="Title=Sunflowers", and
keyword4="Thumbnail".

When inserting a document into the database of the distributed storage system, a hash function h( ) is applied to each keyword of the document. The keywords of a document may be extracted by way of methods known to those skilled in the art. The result of such a hash function h( ) can also be called index identifier or indexID. Such index identifier might already be present in the DHT system, in particular when other documents stored in the distributed storage system comprise the same keyword. A document identifier—also called docID—of the document to be inserted is either additionally assigned to an existing index identifier or assigned to a new index identifier. A list comprising a mapping of document identifiers to index identifiers is also called index document. Such index document might also comprise more than one index identifier and thus deliver information with regard to documents comprising one or more other keywords.

A set of index identifiers extracted from a query for n keywords might look like:
indexID1=h(keyword1),
indexID2=h(keyword2),
. . .
indexIDn=h(keywordn)

An individual keyword can apply to one or more docIDs. As a consequence, each indexID is associated with a set of docIDs to which new docIDs representing documents comprising this keyword are added.

According to the patent application referenced above, a complex query such as a query for several keywords is split into several subqueries. Each subquery, which can also be called atomic query, is a request for document IDs that match a given keyword. For a complex query, several atomic queries are combined in a distributed fashion using boolean operators. An example of a complex query might look as follows:

"Artist=Van" and "Artist=Gogh" and not
("Title=Sunflower" or "Type=Letter")

The resulting complex query is assembled by the appropriate subqueries linked by set operators:

$$V \text{ intersect } G \text{ intersect complement } (S \text{ union } L)$$

wherein:
V, G, S and L are atomic queries for the following keywords:
V="Artist=Van";
G="Artist=Gogh";
S="Title=Sunflower";
L="Type=Letter" and
"intersect", "union", and "complement" are set operations.

This information is then preferentially encoded, e.g., using reverse polish notation (RPN) as instructions for a stack machine.

However, often not only exact queries for a keyword or queries for text containing words or matching keywords are required. It may be necessary to query for value ranges, e.g.: search all files smaller than 100 Kbytes; search all documents newer than Jan. 1$^{st}$, 2001; search articles offered for a range between 10 and 20 Euro; or search cities located between 45 and 49 degrees northern latitude and 50 and 55 degrees eastern longitude. The last example shows that it might also be necessary to search for a two dimensional range, wherein the search for a range "between 45 and 49 degrees northern latitude" represents a search in a first dimension and the search for a range "between 50 and 55 degrees eastern longitude" represents a search in a second dimension. Of course, also an n-dimensional range might be subject to a query.

However, when searching ranges in general, two different approaches are possible:

In a first approach, it envisaged to grant only one shot or access to a single network entity storing an index document (i.e. a set of docIDs linked to an indexID) within the distributed storage system. This approach will result in up to $V*(V-1)/2$ index documents, each containing a subset of the docIDs, to allow arbitrary range queries, wherein V is the size of the value space, e.g. $2^{32}$.

In another approach, it is envisaged to grant only one single copy of a docID in the distributed storage system. This will result in (U−L+1) requests for index documents, where L and U are the lower and upper bound of the searched range, respectively. This mechanism can be run on top of the mechanism described in document EP 03405516.0.

These two approaches show that either a lot of memory space or a lot of queries are required to perform a range search. This is not beneficial for many environments, especially, when the ranges searched do have arbitrary granularity.

Optimization criteria can be: that the amount of required memory space (storage) should be as small as possible. This is a static requirement. The number of entities in the network to visit or index documents to retrieve should also be as small as possible for typical queries. This means that the number of queries for searching the desired range should be as small as possible. This is a dynamic requirement. Depending on a usage scenario, these two requirements may have different priorities.

SUMMARY OF THE INVENTION

According to one aspect of the invention, there is provided a method for searching a range in a set of values in a network with distributed storage entities comprising features described herein.

A method for searching a range in a set of values in a network with distributed storage entities according to the invention comprises the following steps: The range is split up into a set of subranges by means of a hierarchical structure. For this set of subranges a query packet is generated and transmitted to one or more of the distributed storage entities for performing the query.

The values searched can be numerical values of any kind. Preferably, a value represents a characteristic of data stored in the distributed storage network. The data stored can be data of any kind. Data can e.g. be documents, software files, any other data which can be stored and retrieved, etc. Example of characteristics of such data can be the capacity of a document/file, the storing date of a document/file, the price of downloading a document/file, etc. It is understood, that the term searching a value and consequently searching a range within a set of values includes the search for one or more documents, files or any other data stored with which the searched value is associated in form of a property or other characteristics.

It is appreciated that a network entity such as a storing entity or a requesting entity is used equivalent to the term "node" or "network node" known to those skilled in the art. Depending on the usage of such entity, a storage entity can e.g. be embodied as a storage server connected to the internet, while a requesting node can e.g. be embodied as a desktop computer. These are examples only, not limiting the embodiments of the term "entity" used in connection with the invention. The method as proposed requires limited memory space and as few queries as possible.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings, in which.

REFERENCE SIGNS

Figure 1:
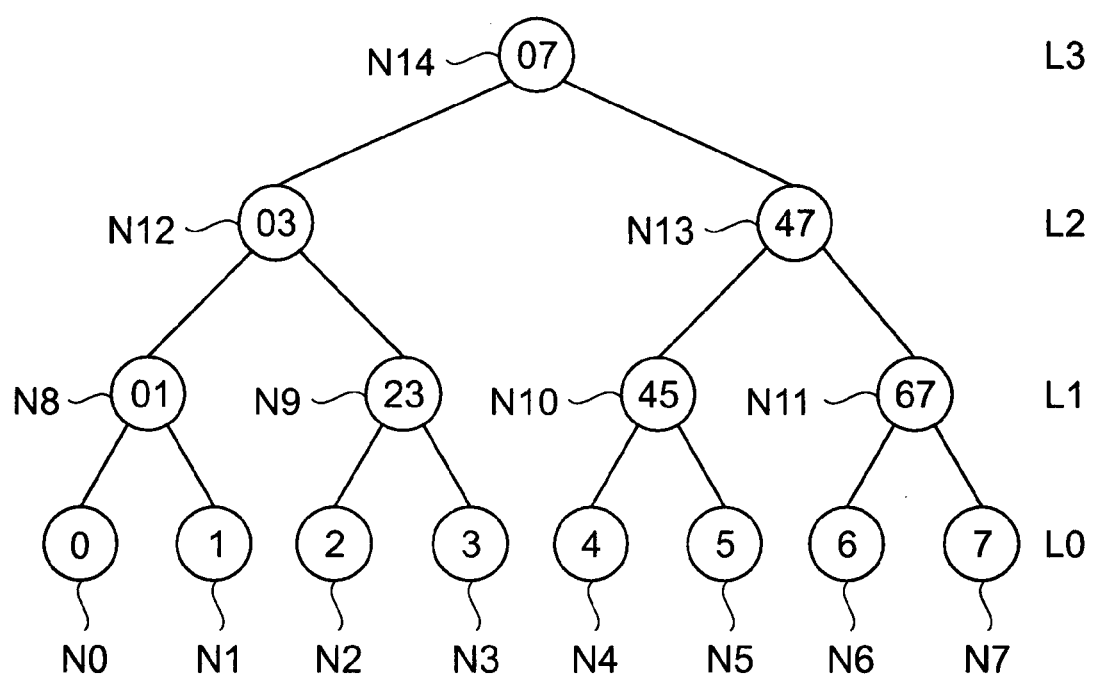
FIG. 1 shows an example of a hierarchical tree structure which can be used to associate values to subranges and subranges to superordinated subranges and to find value ranges.

| | |
|---|---|
| N0–N14 | nodes |
| L0–L3 | hierarchy levels |
| SubQ1 | first subquery |
| SubQ2 | second subquery |
| SubQ3 | third subquery |
| docIDs1 | document identifiers 1 |
| docIDs2 | document identifiers 2 |
| docIDs3 | document identifiers 3 |

DESCRIPTION OF THE INVENTION

In the present invention, there is provided a method for searching a range in a set of values in a network with distributed storage entities comprising features of independent claim 1. An example of a method for searching a range in a set of values in a network with distributed storage entities according to the invention comprises the following steps: The range is split up into a set of subranges by means of a hierarchical structure. For this set of subranges a query packet is generated and transmitted to one or more of the distributed storage entities for performing the query.

The values searched can be numerical values of any kind. Preferably, a value represents a characteristic of data stored in the distributed storage network. The data stored can be data of any kind. Data can e.g. be documents, software files, any other data which can be stored and retrieved, etc. Example of characteristics of such data can be the capacity of a document/file, the storing date of a document/file, the price of downloading a document/file, etc. It is understood, that the term searching a value and consequently searching a range within a set of values includes the search for one or more documents, files or any other data stored with which the searched value is associated in form of a property or other characteristics.

It is appreciated that a network entity such as a storing entity or a requesting entity is used equivalent to the term "node" or "network node" known to those skilled in the art. Depending on the usage of such entity, a storage entity can e.g. be embodied as a storage server connected to the internet, while a requesting node can e.g. be embodied as a desktop computer. These are examples only, not limiting the embodiments of the term "entity" used in connection with the invention. The method as proposed requires limited memory space and as few queries as possible.

Preferably, a method according to the invention comprises the following further steps. For each subrange of said set of subranges a subquery is generated. Such subqueries are combined by means of set operators. In addition, the query packet comprising these subqueries is preferably transmitted sequentially from storage entity to storage entity, wherein each storage entity performs a subquery, combines the result of the subquery with the query result provided by a previous storage entity by applying the corresponding set operator, and forwards the result of this combination. This result can be forwarded to a subsequent storage entity or to the requesting entity for a scenario where all subqueries are executed. The set of storage entities the query packet is transmitted to is preferably a selection of storage entities capable of performing one or more of the subqueries.

The hierarchical structure is used for splitting the searched range into a limited number of subranges. As a selection of a subrange causes a generation of an associated subquery, a smart set up of the hierarchical structure has impact on the efficiency of executing the query. The hierarchical structure is accessible for the requesting entity. Thus, the hierarchical structure can be stored at a requesting entity or elsewhere in the distributed storage system provided access is granted to such requesting entity.

The hierarchical structure preferably comprises nodes on different levels. Provided the hierarchical structure comprises nodes, a subrange of values is preferably associated to each node of said hierarchical structure. In this context, a node is understood as logical node of the hierarchical structure. However, such a logical node can also be mapped to a physical network node, i.e. a storage entity. Then, such storage entity holds information about the subrange associated to this particular node. The subrange can represent the maximum value range which can be accessed from this node.

In a particular preferred embodiment, the hierarchical structure comprises a tree structure comprising child nodes on a lower level assigned to a parent node on the next higher level, which parent node in turn can simultaneously be a child node assigned together with other child nodes on the same level to a parent node on the next higher level, and so forth. A subrange of values associated to a parent node comprises the subranges of values associated to the corresponding child nodes. This means that subranges associated to nodes e.g. on the most bottom level are aggregated and this aggregation is associated to the respective parent node on the next higher level. According to such a set up of the hierarchical structure, the parent node on the highest level comprises an aggregation of all the subranges associated to nodes on the lowest level, which aggregation typically covers the entire set of values available.

A value preferably represents data characterized by said value. Taking this into account, a node of said hierarchical structure preferably comprises a list which indicates data characterized by a value of the subrange associated to said node. Provided the data is embodied as documents and each of which documents is identified by a document identifier, the list preferably comprises a listing of all document identifiers indicating documents which show a value belonging to the subrange of values that is associated to this particular node. Provided the subrange of this node can be represented by an index identifier, the list comprises a mapping of document identifiers to an index identifier. Such a list is also called index document.

The index identifier can be a representation of a subrange of values, or of a single value e.g. when only a single value is associated with a node of the hierarchical structure. The representation can be embodied e.g. in form of a result of a hash function applied to the subrange respectively the value. Alternatively, the representation can be the subrange respectively the value itself.

In an embodiment of the method according to the invention, the values are document identifiers.

Provided a logical node of the hierarchical structure is mapped to a physical entity of the network, this physical entity holds the list identifying all documents related to the subrange of values associated to this node. Thus, all the documents listed e.g. by means of their document identifiers in the list associated to this particular node can be accessed via this entity. This does not necessarily mean that all the documents are physically stored on this particular entity. The list might also provide information as to where a document listed can be found across the network. However, this particular entity is preferably the addressee of a subquery issued by the requesting entity, provided the searched range covers the subrange of values associated to this particular entity.

In order to enable selecting the appropriate subranges, knowledge related to the hierarchical structure may be provided by way of a property document comprising at least one of the following parameters of said hierarchical structure: the branching degree, potentially detailed per level or per subtree; the number of levels; the number of nodes; the subrange associated to a node; the child and/or parent nodes of a node; the maximum available value range; the query encoding. Such a property document can be held by entities holding index documents and/or by requesting entities and/or by a different infrastructure.

An administrative entity might take control over updating either the hierarchical structure itself or the property document or both of them. Such administrative entity preferably comprises a control unit for performing at least one of the following tasks: restructuring the hierarchy; updating a property document; creating, deleting, and/or updating index documents associated to nodes/subranges of the hierarchical structure.

The following preferred embodiments are directed towards preferred ways on how to split the searched range into subranges. One preferred way is to split up the searched range into a set of subranges, which set comprises a minimum number of subranges. Provided the hierarchical structure is set up in form of a tree as described, it is preferred to have subranges selected at higher levels of the structure—provided such a subrange is fully covered by the searched range—instead of selecting the aggregated lower level subranges in order to optimize the number of access steps to the selected nodes. In other more general words, it is preferred to split up the searched range into subranges as large as possible. Doing so, overhead in executing subqueries can be reduced.

Preferably, the selected set of subranges in total covers the searched range. Hence, the range of a query is preferably split up into one or more subranges—i.e. a set of subranges—until the query can be performed using these subranges. On the other hand, it is preferred to achieve that only the range itself is covered by the subranges in order not to include superfluous values resulting from a disadvantageous choice of over-sized subranges. This can be achieved by splitting the range into the largest prefix-based subsets as follows: First, both ends of the range are extended to move to the next boundary representable by the granularity chosen for the tree. Then, the lower end (L) of the range is taken and a subrange is picked starting from there, which is the size of the largest power of k, say $k^s$, (where k is the branching degree of the tree) still fulfilling the following two criteria: (1) $L+k^s<U$, where U is just above the upper end of the range, i.e., r is inside the range iff [=if and exactly if] $L<=r<U$; (2) $k^s$ divides L (i.e., it makes it a prefix, representable by a subtree). When the first subrange from L to $L+k^s$ (exclusive) has been selected, the lower end of the range is raised from L to $L+k^s$ and the entire process is repeated until the range is exhausted.

The range can also be split up into a set of subranges in such a way that data to be transferred in response to the query is minimized. With regard to a hierarchical tree structure, by way of selecting non-overlapping subranges the data transferred can be minimized. With regard to hierarchical structures other than tree structures, the data to be transferred can e.g. be minimized by way of selecting subranges which overlapping values are minimized. This has the advantage that the data traffic on the network generated by transferring the results of the subqueries to the requesting node is as little as possible in order to relieve the network load.

In another embodiment of the method according to the invention the search range is split up in such a way that the subranges cover the range with as less nodes as possible.

The range can also be split up in such a way that the resource consumption is as little as possible. Resources may e.g. be the network, the number of prefixes, etc. Under some circumstances, the number of prefixes to be retrieved has more impact on the resource consumption than the amount of data being transferred or the number of direct queries to the documents. This includes the case where the tree is very deep and the leaves or low nodes in the tree are very likely to be empty. Then, retrieving a larger prefix (extending beyond L and/or U) than calculated using the above algorithm might be more efficient. As consequence, the necessary computing performance and the network load can be reduced.

If the value space in the bottommost nodes, i.e. the nodes on the bottommost level consisting of the most specific subranges, is very sparsely occupied, the bottommost level may not be implemented in the hierarchical structure according to another embodiment of the present invention. This can be also be repeated, e.g. such step may apply to more than one bottom level. In case the bottommost level or levels are not implemented in the hierarchical structure a true membership for the documents referred to by the first or last subrange in a query range can be obtained otherwise, e.g., by looking at the documents themselves.

If the value space in the topmost nodes, i.e., the nodes on the topmost level consisting of the least specific or most heavily aggregated subranges, has a disadvantageous or inefficient ratio of size versus the request ratio, the topmost level may not implemented in the hierarchical structure according to another preferred embodiment of the present invention. This can be also a repetitive process, i.e., it may apply to more than one top level.

Preferably, subqueries whose results are united may partially or entirely be performed simultaneously. Advantageously, this approach delivers the entire query result much faster. It can also be provided that after the last subquery is performed the query result is transferred to the requesting entity.

Viewing the present invention from another angle, there is provided a method for supporting insertion of data into the database of a distributed storage system, comprising the steps of determining at least one value associated with said data, by means of a given hierarchical structure which groups values of a set of values into subranges determining a subrange the determined value belongs to, and adding information about this data to a list—i.e. typically the index document—associated to said subrange.

This method describes how new or additional data can be inserted into the distributed storage system which data is not yet integrated in the existing hierarchical structure for alleviating a search for ranges. Such data/documents has to be made familiar to the existing system. Hence, preferably all values representing such data are determined. An algorithm might support such determination, which algorithm e.g. extracts relevant values from the data itself. However, such data might be determined without further effort, such as if the set of values being focused on is e.g. the size of the data being accessible via an operating system handling such data. Once the value is determined, there has to be determined a place in the hierarchical structure where to assign this value to. Such place might be a subrange of values associated to a node of the hierarchical structure or the node itself. The set up and implication of the hierarchical structure is preferably the same as described hereinbefore. Once the subrange or its associated node in the hierarchical structure is determined, the list—i.e. the index document—associated to this subrange is updated by adding information about the data to be inserted into the distributed storage system. Such index document as described before preferably comprises a mapping of data identifiers—also called document identifiers—to representations of values—also called index identifiers—belonging to the associated subrange. A data identifier identifying the data to be inserted is then mapped to a representation of the value determined for this data to be inserted. Typically, by determining the index identifier, the location for storing the new data is also determined due to given scheme.

In particular, when the hierarchical structure includes a tree structure comprising parent nodes having a subrange of values associated which subrange is an aggregation of the subranges associated to all child nodes, it is preferred having all the nodes/subranges determined to which the identified value belongs to—which is one node in every level of the hierarchy due to the aggregation model—and having added information about this new data to any document associated to any one of the determined subranges. Such information is preferably the data/document identifier.

In case the value associated to be inserted data is not included in the existing hierarchical structure—e.g. there is no subrange existing in this structure which comprises such a value—such value might be introduced to the structure, e.g. by extending an existing subrange or by adding a new subrange comprising such value which is equivalent to adding a new node to the structure. An administrative function might take responsibility for amending the structure before the inserting function is continuing introducing the new data to the distributed storage system.

There is also provided a method for disconnecting data from a distributed storage system comprising the steps of determining at least one value associated with said data, by means of a given hierarchical structure which groups values into subranges of a set of values: determining a subrange the determined value belongs to, and deleting information about said data from a list associated to said subrange. The bare disconnection itself does not necessarily include deleting the data itself at all possible storage entities. It a first step, the information about such data—i.e. preferably the data/document identifier—is removed from the lists/index documents. Again, for removing such information, the nodes/subranges of the hierarchical structure from which a value representing the data is to be disconnected has to be identified. Again, it is preferred to have such information removed from all nodes/subranges respectively from the associated lists/index documents, i.e. in all hierarchy levels of the hierarchical structure.

In another step, it is preferred deleting the disconnected data from storage entities finally. With regard to the insertion method, it is also preferred to store the data to be inserted at an appropriate place in the distributed storage system which place might also be indicated in some list, e.g. the index document, or in another reference document.

For both the inserting mechanism and the disconnecting mechanism, it might be preferred to treat values of data in their entirety: Thus, it might be of interest that not only one value representing the data in question is determined but all values which represent the data and which might be subject to a query are determined. Thus, hierarchical structures for different sets of values (e.g. file sizes, date of last modification, costs) have to be modified when adding new data or disconnecting data form the distributed storage system. Consequently, for new data to be inserted or recorded data to be disconnected, there may be multiple steps for determining values representing such data and for modifying multiple hierarchical structures for different sets of values.

In accordance with the present invention, there is provided a requesting entity for searching a range in a set of values in a network with distributed storage entities, comprising a control unit designed for executing steps according to a method as claimed in any one of the claims related to searching a range in a set of values.

In accordance with the present invention, there is provided a data insertion entity for supporting insertion of data into a network with distributed storage entities, comprising a control unit designed for executing steps according to a method as claimed in any one of the claims related to inserting data into the distributed storage system.

There is also provided a data disconnecting entity for supporting disconnection of data from a network with distributed storage entities, comprising a control unit designed for executing steps according to a method as claimed in any one of the claims related to disconnecting data from the distributed storage system.

For all the methods provided, there are also provided corresponding computer program elements comprising computer program code for performing steps of such methods when loaded in a digital processor of a system's entity.

Finally, in accordance with the present invention there is provided a data network, comprising at least one requesting entity as claimed and storage entities. Such data network is preferably embodied as a peer to peer network. Such data network might in addition comprise one or more administrative entities, data insertion entities, data disconnecting entities, etc. On a single physical entity—such as a computer or a server—there are preferably implemented more functions of the system. Thus, a single server might primarily serve as a storage entity for storing data, however such server might also be used for inserting new data into the system, or for disconnecting data from the distributed storage system. In addition, such server might also host the administration function.

It is appreciated that preferred embodiments as well as advantages introduced with respect to any method according to the present invention do also apply to the other aspects—such as apparatus', computer program elements or data networks—of the present invention.

FIG. 1 shows an example how a value space V=[0, 7] having values between 0 and 7, inclusively, can be organized in a hierarchical tree structure. The tree structure can be used to associate these values to subranges and the subranges to superordinated subranges and this superordinated subranges in turn to the value space V. After the tree structure has been defined, values and value ranges can be found with the help of the tree structure given explicitly or by the use of an algorithm.

It should be noted that a single value in the tree of FIG. 1 can be associated with one or more document IDs. If for example a query looks like: search all paintings by van Gogh which he painted in the years 1887 to 1888, then each of the two values 1887 and 1888 can be associated with several paintings by van Gogh. In this example, each van Gogh painting would be stored in the distributed storage network as document having a unique document identifier assigned. A value in form of an attribute to a document might be the year the painting shown in the document was painted. A set of values in which a range search can be performed might either be unlimited and include here all the year numbers, or might be limited a priori, e.g. allowing only a limited year numbers, e.g. from 1800 to 2000. Provided each year number provides a subrange of the set of values such subrange might be represented by the year number itself or another representation of the value, e.g. a hash function applied to the keyword "year=1800" in case the value is "1800". Note that such value represents itself a range in case the date attributed to data is based on finer granularities, such as days or seconds. Such value or representation of a value might also be called index identifier, and the entire list of document identifiers assigned to the index identifier might also be called index document.

In the example of FIG. 1, a hierarchical tree structure is introduced that provides four levels L0 to L3, wherein the bottommost level L0 is the level with the biggest number of nodes, wherein each node comprises the smallest set of values, and in an extreme case provides only one single value. It should be noted that if a node of the tree has no values associated with it, it does not need to be stored. The nodes on the bottommost level L0 are also called leaves. In FIG. 1, to each node of level L0 only a single value is associated and documents represented or characterized by this value/showing a property including this value can be accessed via this node. In this context, it is understood that accessing a value includes accessing documents characterized by this value. From node N0 for example only the value 0 can be accessed. On the next higher level L1 the parent nodes N8, N9, N10 and N11 are arranged. From these nodes N8-N11, which are superordinated nodes or parent nodes with respect to the nodes N0 to N7, the bottommost nodes or child nodes N0-N7 can be accessed. The node N8 for example covers the subrange [0, 1], while the node N10 covers the subrange [4, 5]. On level L2 the nodes N8 and N9 are linked to the node N12 covering the subrange [0, 3] and which is the parent node with respect to the nodes N8 and N9, which in turn are with respect to the node N12 the child nodes. The same applies to nodes N10, N11 and N13 analogous. On the topmost level L3 exists only one node N14, also called root node, which is the parent node with respect to the nodes N12 and N13 and covers the entire value set V=[0, 7]. In FIG. 1 the tree structure has always two branches, this means that each parent node is connected to two child nodes. Therefore the branching factor k=2. Furthermore, the tree structure has four levels L0 to L3, i.e. a depth of 4, and 15 nodes N0 to N14, and comprises a value space V=[0, 7]. The range covered is thus bounded by the values 0 and 7.

Each node preferably comprises an index document or list which contains an index about the one or more values which are accessible by this node. This index document can further comprise document identifiers assigned to the values listed in this index document. The node can further comprise a property document containing further information, e.g. information about child nodes, a parent node, a branching factor, number of levels and/or query encoding.

For example, when searching for the range [2, 6], three requests or subqueries SubQ1, SubQ2 and SubQ3 are placed: The first subquery SubQ1 for the contents of the index document 23, the second subquery SubQ2 for the index document 45 and the third subquery SubQ3 for the third index document 6. The subqueries SubQ1, SubQ2 and SubQ3 are then united. Without having a tree structure the search for the range [2, 6] would either generate five single queries, one query for each value, which number of queries is nearly two times higher than the number of queries achieved in accordance with the method introduced here. Alternatively, it would be necessary to store in each requested node of the hierarchical structure all values between 2 and 6. This would cost more storage than it costs when applying the method according to the invention. The benefits will even be more significant for larger value spaces/trees.

Provided that the tree has a branching factor k=2 and the range, which shall be searched is [2, 6], then the division of the search range [2, 6] is carried out as follows, wherein any bit marked by an "x" denotes an arbitrary value.

| range | binary value | expansion | subranges |
|---|---|---|---|
| lower bound: 2 | 0010 | 0010 | |
| | | 0011 | 001x |
| | | 0100 | |
| | | 0101 | 010x |
| upper bound: 6 | 0110 | 0110 | 0110 |

The automatic split up of the search range is carried out in several steps. First, the last bit of the lower bound 0010 is incremented and checked whether it exceeds the upper bound. If this is not the case, the first subrange 001x can already be formed. Afterwards the next bit is incremented (0100) and checked again whether this value 0100 exceeds the upper bound. These steps are repeated until the incremented value has reached the upper bound. Always the values, whose last bits can be 0 or 1, and which furthermore still have not exceeded the upper bound, are combined to subranges. The example above results in three subranges 001x, 010x 0110 and 0110, wherein the last subrange comprises only one value.

The same procedure can be applied of course for a branching factor k=3 or higher. For a branching factor k=3 the number system should not be binary but have base 3.

Generally, the hierarchical tree may have a branching factor k and covers a value space V. The root node covers the entire value space V, while the child nodes of the root node cover subranges thereof, wherein the subranges abut in pairs, and summing up the range covered by their parent node. Each subrange covered by a child node can be similarly further subdivided into k child nodes and therefore in k subordinated subranges. It is noted that the branching factor k can vary from level to level or even from node to node. However, simple rules for determining the branching factor k are advantageous.

In general, the storage consumption is O(log V). In systems which are complex in terms of space or time, O(x) means that for large x, a constant C can be found, for which C*x>=the number of actual steps, S. Similarly, O(log V) results in C*log V>=S, for that algorithm. As a corollary, the storage is roughly proportional to log V. The number of queries is also O(log V).

In the following the performance for some cases is described in more detail as worst-case analysis.

1. Assume that the only operation supported by the distributed hash table (DHT), directly or indirectly through sending the individual parts to the querier, is UNION.
   a) For the case that the branching factor is k=2, the necessary worst case storage is $1+\log_2 V$, and the number of worst case search queries is $2 \log_2 V$.
   b) For the case that the branching factor is k=3, the necessary worst case storage is $1+\log_3 V$, and the number of worst case search queries is $2*2 \log_3 V$.
   c) For the case that the branching factor is k, the necessary worst case storage is $1+\log_k V$, and the number of worst case search queries is $2(k-1)\log_k V$.
2. Assume that the operation EXCEPT is also easily supported (a EXCEPT b=a AND (NOT b)).
   a) For the case that the branching factor is k=2, the necessary worst case storage is $1+\log_2 V$ (average: $1+0.5 \log_2 V$), and the number of worst case search queries is $\log_2 V$ (average: $1+0.5 \log_2 V$).
   b) For the case that the branching factor is k=3, the necessary worst case storage is $1+\log_3 V$, and the number of worst case search queries is $2 \log_3 V$.
   c) For the case that the branching factor is k=4, the necessary worst case storage is $1+\log_4 V$, and the number of worst case search queries is $2*2 \log_4 V$.

Optimizations

It might not be preferred to keep the bottommost levels of the hierarchical structure. Omitting the bottommost levels can especially be useful if in the nodes on the bottommost level the values are very sparsely distributed, i.e. the nodes are very sparsely occupied, the resolution is very high or even unlimited. The documents in the boundary nodes (left and right edge of the range) need then be inspected manually whether the individual documents are in fact inside the range. If the bottommost nodes are sufficiently fine-grained, this additional effort may be negligible, especially if the document can easily be checked whether it is inside the boundaries.

It might not be preferred to keep the topmost levels. Omitting the topmost levels is especially useful, if the topmost nodes are very large, as they each contain a substantial subset of all the documents having that property, almost independent of the value of the property. Removing them substantially reduces the storage requirements. Also, having to send out multiple requests for index documents is cost-effective when each of the documents is (relatively) large. The total amount of data received by the requesting node or querier does not change, yet load balancing is achieved among the serving nodes.

As mentioned above, these parameters as well as branching degree, value space and query encoding may be well-known for a particular property or may be stored in a per-property document as metadata.

Irregular Trees

Often, it may not be sufficient to have static tree parameters, especially when the document density is very unevenly distributed over the entire value range. Then, the tree may also be linked in a more traditional way:
1. Parent nodes know their children nodes and their respective subranges.
2. Children nodes know their parent nodes, and if necessary their total range.
3. Nodes know their neighbor nodes at the same level, and if necessary the range they cover.

Using connectivity 1, it is possible to walk this distributed tree just like walking an in-memory tree, wherein the root cannot be trimmed in that case.

Using connectivity 2 and 3, or alternatively 1 and 2, it is possible to walk this distributed tree bottom-up, starting at both sides of the range until they meet.

Further, the tree structure could also be influenced by some a priori knowledge of the expected queries, e.g. typical ranges. Typical ranges may even be used outside of a tree structure as optimizations, i.e., these special entries would not fit into the tree themselves.

Figure 2:
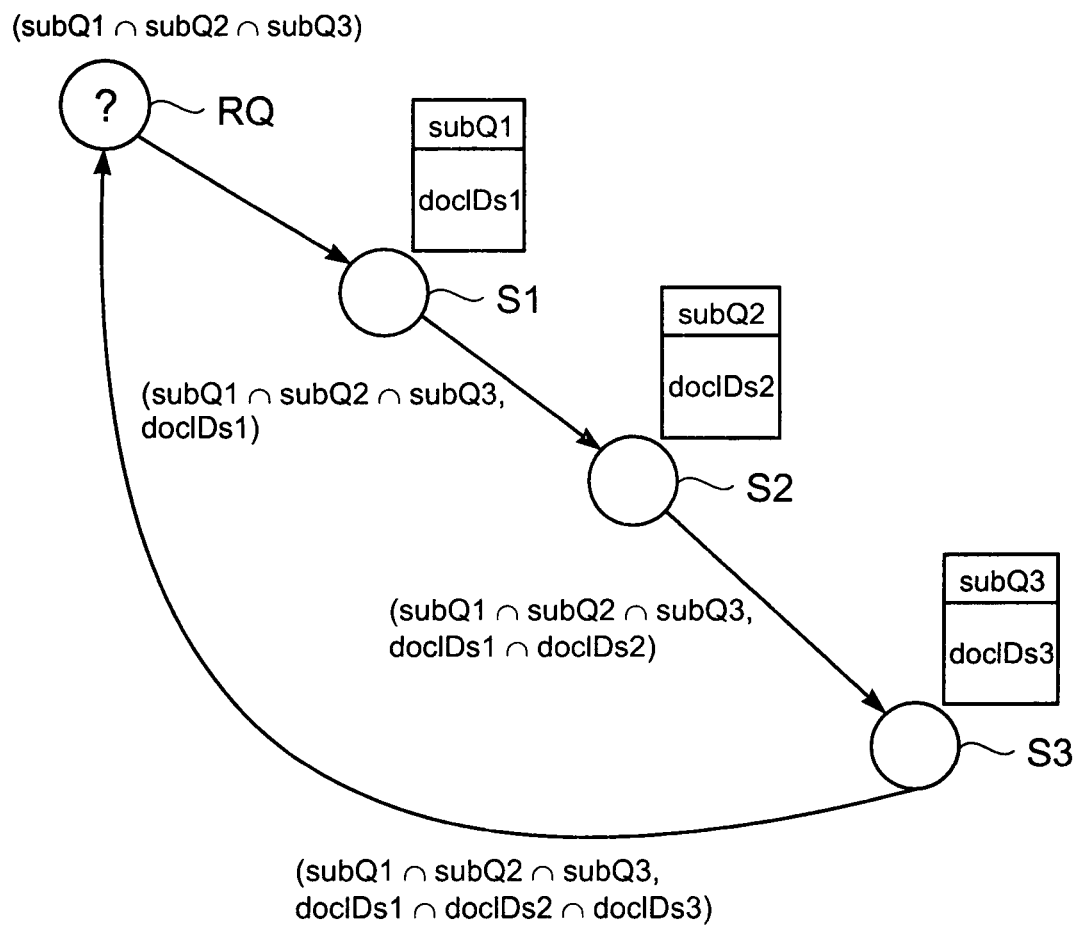
FIG. 2 shows an exemplary embodiment of a distributed storage network in which a method for performing a search of a range is executed in accordance with the present invention.

In FIG. 2 an exemplary application of the method for performing the search of a range in a network by means of subqueries is illustrated. As can be seen, the query comprising the subqueries SubQ1, SubQ2 and SubQ3 is transmitted from the requesting node RQ to a first, second, and third storage node S2, S3, S4, while the query result is completed step by step. Finally, the last storage node S3 sends the query including the definite query result—which is a list of documents identifiers—back to the requesting node.

If for example the tree is the tree from FIG. 1, and the range [1, 5] shall be searched, the subqueries SubQ1, SubQ2 and SubQ3 are:

SubQ1=[0],

SubQ2=[0, 3], and

SubQ3=[4, 5]

The entire query Q is:

$Q=(((NOT\ SubQ1) \cap SubQ2) \cup SubQ3)$

Figure 3:
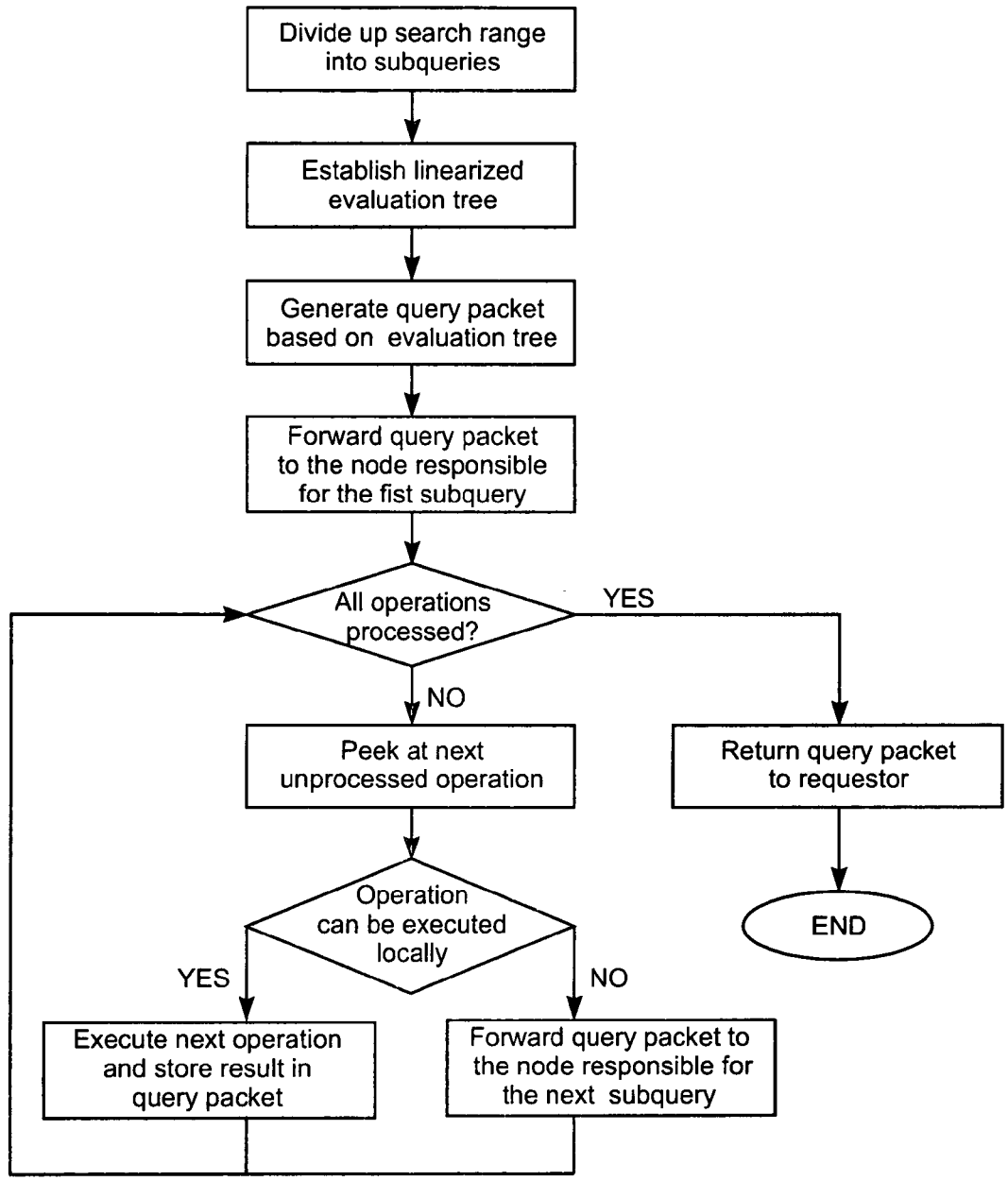
FIG. 3 shows a flow diagram for a method introduced with regard to the network according to FIG. 2.

FIG. 3 shows the flow diagram for performing a query in accordance with an embodiment of the present invention. At first, the search range is divided up into subranges and the corresponding subqueries SubQ1, SubQ2 to SubQN by means of a linearized evaluation tree and a query packet Q=(SubQ1∩SubQ2∪ . . . SubQN) based on the evaluation tree is generated. After the query packet is forwarded to the storage node, which is responsible for the first subquery SubQ1, the first node (as every latter node at this point) first checks, whether already all operations OP1-OPQ of the complex query Q are processed. If this is not the case, the next operation (for the first node, this is OP2) is fetched and it is checked whether the operation (e.g., OP2) can be executed locally. If not, the query packet is forwarded to the node, which is responsible for the next subquery SubQ2. If the operation OP2 can be executed locally, the operation OP2 is executed and the result stored in the query packet. Therefore, the query packet is updated. In the next step it is checked again whether all operations are already processed. If not, the next operation OP3 is fetched and the above mentioned steps are repeated. This loop is repeated until all operations OP1-OPN are processed. Finally the updated query packet is returned to the requestor.

Further explanations of how the execution of the query as such can be performed can be found in the above mentioned IBM patent application EP 03405516.0. Therefore, this document is incorporated by reference.

An alternative method to perform the subqueries, which are generated in the above described way, is described in "Efficient Peer-to-Peer Keyword Searching", Patrick Reynolds and Amin Vahdat, Middleware 2003, Rio de Janeiro, Brazil, Jun. 16-20, 2003, Springer LNCS 2672, ISBN 3-540-40317-5.

The method for searching a range in a network with distributed nodes according to the invention is suitable for all kinds of ranges which have a naturally order, i.e. the set of values in which a range can be searched is arranged in a certain order, for example time, amounts of money, distances, degree numbers, and weight, and also document identifiers.

With regard to generating a hierarchical structure, it is worth mentioning that it is up to the designer of such hierarchical structure on how to best assign subranges to nodes of such hierarchical structure: E.g., two or more subranges may be merged and the resulting range stored in a parent node of a second level in case it is considered not worth to maintain two separate nodes for these particular subranges for what ever reasons (such as rare access observed to these nodes).

With regard to an implementation of the hierarchical structure, preferably a child node knows its parent node and/or it is provided that a node knows its neighbor nodes. This can be realized for example by means of pointers or knowledge inferred from the result of an algorithm e.g., by knowing the branching factor k and the encoding of indexIDs.

It also should be mentioned that an indexID is advantageously deduced from a function with one of the following forms: f(keyword, start, end), f(keyword, start, length), f(keyword, start, level), or f(keyword, start, prefix-length), where f( ) might take the form of a hash function.

Having illustrated and described a preferred embodiment for a novel method and apparatus it is noted that variations and modifications in the method and the apparatus can be made without departing from the spirit of the invention or the scope of the appended claims.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A search method comprising steps of:
searching a range of user defined search attributes from a search query in a set of values in a distributed hash table database to determine at least one database node of a distributed database wherein the search will be performed, wherein each of the at least one database nodes stores a subset of a searched value in one or more distributed storage entities, said searched value comprising:
at least one file or other data stored, said searched value representing a data attribute stored in the distributed storage network,
wherein the step of searching comprises the following steps:
splitting said range of user defined search attributes into a set of subranges, wherein each subrange of said user defined search attributes comprises a subset of the values of said user defined search attribute, by:
generating a hierarchical tree structure accessible to a requesting entity; and
associating each subrange of data attribute values with a database node of the hierarchical tree structure, wherein said hierarchical tree structure comprises nodes on different levels;
wherein each subrange represents a maximum value range which can be accessed from the node;
generating an encoded query packet combining each subrange, for the set of subranges by generating a subquery for each subrange of said set of subranges;
combining the subqueries with set operators, wherein:
a subrange of values associated to a parent node comprises the subranges of values associated to corresponding child nodes;
a value represents data characterized by said value, and said hierarchical structure comprises a tree structure, and the set of subranges in total covers the searched range, and
wherein the step of splitting splits the range into a largest prefix-based subsets by:
extending both a lower end and an upper end of the searched range to move to a next boundary representable by a granularity chosen for the tree structure, comprising steps of:
taking the lower end (L) of the searched range;
picking a subrange starting from (L), which has a size the largest power of k, called $k^s$, where k is a branching degree of the tree fulfilling two criteria:
(1) $L+k^s<U$, where U is just above the upper end of the range, for r inside the range iff $L<r<U$; and
(2) $k^s$ divides L making it a prefix, representable by a subtree, and
raising the lower end of the range from L to $L+k^s$, when the first subrange from L to $L+k^s$ has been selected, and setting (L) equal to L to $L+k^s$, and repeating the steps picking and raising until the search range is exhausted;
a node of said hierarchical structure comprises a list which list indicates data characterized by a value which value belongs to a subrange associated to said node;
said range is split up into said set of subranges, said set comprising a minimum number of subranges;
said range is split up into said set of subranges which set in total covers the range;
said range is split up into said set of subranges in such a way that data to be transferred in response to the query is minimized;
transmitting the encoded query packet to one or more of said distributed storage entities for performing a query;
wherein the transmitting step comprises transmitting the encoded query packet sequentially from one of distributed storage entities to another one of the distributed storage entities, wherein each of such storage entities performs a subquery from the encoded query packet, combines the result of said subquery with a query result provided by a previous distributed storage entity by applying the corresponding set operator, and forwards a result of this combination;
and
returning documents within the searched range of data attribute values.

2. The method according to claim 1, wherein said tree structure comprises child nodes on a lower level associated to a parent node on the next higher level, and wherein a subrange of values associated to a parent node comprises the subranges of values associated to the corresponding child nodes.

3. The method according to claim 1, wherein each node of said hierarchical structure comprises a list which list indicates data characterized by a value which value belongs to the subrange associated to said node.

4. The method according to claim 1, wherein said range is split up into said set of subranges which set in total covers the range.

5. The method according to claim 1, wherein said range is split up into said set of subranges in such a way that data to be transferred in response to the encoded query packet is minimized.

6. The method according to claim 1, further comprising utilizing a property document comprising at least one of the following parameters of said hierarchical tree structure:
a branching degree;
a number of levels;
a number of nodes;
the subrange associated to a node;
a child and/or parent nodes of a node;
a maximum available value range; and
the query encoding.

7. The method according to claim 1, further comprising transmitting said encoded query packet sequentially from one of the distributed storage entities to another one of the distributed storage entities, wherein each of such distributed storage entities performs a subquery, combines the result of said subquery with a query result provided by a previous storage entity by applying the corresponding set operator, and forwards the result of this combination.

8. An insertion method for insertion of data into a distributed hash table database, the insertion method comprising:
determining all user defined search attribute values associated with said data, wherein the user defined search attribute values span a range of values;
determining a user defined search subrange of attribute values within a hierarchical structure where each attribute value is to be assigned;

wherein said hierarchical structure comprises a tree structure, and the subranges in total cover the searched range of values;

splitting the searched range of values into a largest prefix-based subsets by:

extending both a lower end and upper end of the searched range to move to a next boundary representable by a granularity chosen for the tree structure, comprising steps of:

taking the lower end (L) of the searched range;

picking a subrange starting from (L), which has a size the largest power of k, called $k^s$, where k is a branching degree of the tree fulfilling two criteria:

(1) $L+k^s \leq U$, where U is just above the upper end of the range, for r inside the range iff $L \leq r < U$; and (2) $k^s$ divides L making it a prefix, representable by a subtree, and raising the lower end of the range from L to $L+k^s$, when the first subrange from L to $L+k^s$ has been selected, and setting (L) equal to L to $L+k^s$, and repeating the steps picking and raising until the search range is exhausted;

updating an index document associated with the determined subrange once the subrange is determined, wherein the updating comprises adding information about the data to be inserted into the distributed storage system;

wherein the index document comprises a mapping of data identifiers belonging to the associated subrange; and mapping the data identifier identifying the data to be inserted to a representation of each attribute value determined for the data to be inserted.

9. A disconnection method comprising supporting disconnection of data from a distributed hash table database, the step of supporting comprising:

determining at least one value associated with said data, by means of a given hierarchical structure which groups values of user defined search attributes into subranges of a set of values:

determining a subrange to which the determined value belongs, and deleting information about said data from a list associated to said subrange without deleting the data itself;

wherein said hierarchical structure comprises a tree structure, and the set of subranges in total covers the searched range, and further comprising a step of splitting that splits the searched range into a largest prefix-based subsets by:

extending both a lower end and an upper end of the searched range to move to a next boundary representable by a granularity chosen for the tree structure, comprising steps of:

taking the lower end (L) of the searched range;

picking a subrange starting from (L), which has a size the largest power of k, called $k^s$, where k is a branching degree of the tree fulfilling two criteria:

(1) $L+k^s \leq U$, where U is just above the upper end of the range, for r inside the range iff $L \leq r < U$; and (2) $k^s$ divides L making it a prefix, representable by a subtree, and raising the lower end of the range from L to $L+k^s$, when the first subrange from L to $L+k^s$ has been selected, and setting (L) equal to L to $L+k^s$, and repeating the steps picking and raising until the search range is exhausted.

10. An entity tangibly embodied on a computer readable medium, said entity for requesting a search for a range in a set of values in a network with distributed storage entities, comprising a control unit designed for executing steps according to a method as claimed in claim 1.

11. A data inserting entity tangibly embodied on a computer readable medium, said entity for supporting insertion of data into a distributed storage system, comprising a control unit designed for executing steps according to the method as claimed in claim 8.

12. A data disconnecting entity tangibly embodied on a computer readable medium, said entity for supporting disconnection of data from a distributed storage system, comprising a control unit designed for executing steps according to the method as in claimed claim 9.

13. A data network, comprising at least one requesting entity as claimed in claim 10 and multiple storage entities.

14. An article of manufacture comprising a computer readable medium having computer readable program code means embodied therein for causing a search of a range in a set of values in a network, the computer readable program code means in said article of manufacture comprising computer readable program code means for causing a computer to perform the steps of claim 1.

15. A program storage device readable by machine, tangibly embodying a program of instructions executable by the machine to perform method steps for supporting insertion of data into a distributed storage system, said method steps comprising the steps of claim 8.

16. A program storage device readable by machine, tangibly embodying a program of instructions executable by the machine to perform method steps for supporting disconnection of data from a distributed storage system, said method steps comprising the steps of claim 9.

* * * * *